United States Patent [19]
Lee

[11] Patent Number: 5,507,020
[45] Date of Patent: Apr. 9, 1996

[54] SPECTRAL SHARING COMMUNICATION SYSTEM WITH MINIMAL INTER-SIGNAL INTERFERENCE

[75] Inventor: William C. Y. Lee, Danville, Calif.

[73] Assignee: AirTouch Communications of California, San Francisco, Calif.

[21] Appl. No.: 326,045

[22] Filed: Oct. 19, 1994

Related U.S. Application Data

[63] Continuation of Ser. No. 940,541, Sep. 4, 1992, abandoned.

[51] Int. Cl.$^6$ ..................................................... H04B 17/02
[52] U.S. Cl. .......................... 455/137; 455/60; 455/63; 455/69; 455/303; 342/366
[58] Field of Search ..................................... 455/137, 138, 455/139, 33.2, 60, 63, 67.1, 67.3, 67.5, 69, 303, 304, 305, 273; 343/895; 342/361, 362, 363, 364, 365, 366, 380, 381, 383, 384

[56] References Cited

U.S. PATENT DOCUMENTS

| | | | |
|---|---|---|---|
| 3,093,824 | 6/1963 | Ammerman | 342/365 |
| 3,784,915 | 1/1974 | Oswald et al. | 455/137 |
| 3,883,872 | 5/1975 | Fletcher et al. | 342/363 X |
| 4,613,990 | 9/1986 | Halpern | 455/33.2 |
| 4,723,321 | 2/1988 | Saleh | 455/137 X |
| 5,144,642 | 9/1992 | Weinberg et al. | 455/226.1 X |

*Primary Examiner*—Reinhard J. Eisenzopf
*Assistant Examiner*—Philip J. Sobutka
*Attorney, Agent, or Firm*—Merchant, Gould, Smith, Edell, Welter & Schmidt

[57] ABSTRACT

A communications system is disclosed for spectrum sharing of a microwave point-to-point system and a PCS system. The invention comprises a microwave communications system. This system includes a transmitter for transmitting a first signal and a second signal. The first signal and the second signal are oppositely circularly polarized electromagnetic waves within a predefined frequency range. The system also includes a receiver for receiving the first and second signals. In the preferred embodiment of the present invention the receiver may further include a first microwave receiver for receiving the first signal. It would then include a second receiver for receiving the second signal. The receiver would also include signal combining circuitry for combining the first signal and the second signal to generate a composite signal. It would then include a signal comparator to generate a comparison signal by comparing the average value of the amplitude of the composite signal with a predetermined value. Finally, the system would include a control circuit responsive to the comparison signal for modifying the operation of the transmitter.

11 Claims, 2 Drawing Sheets

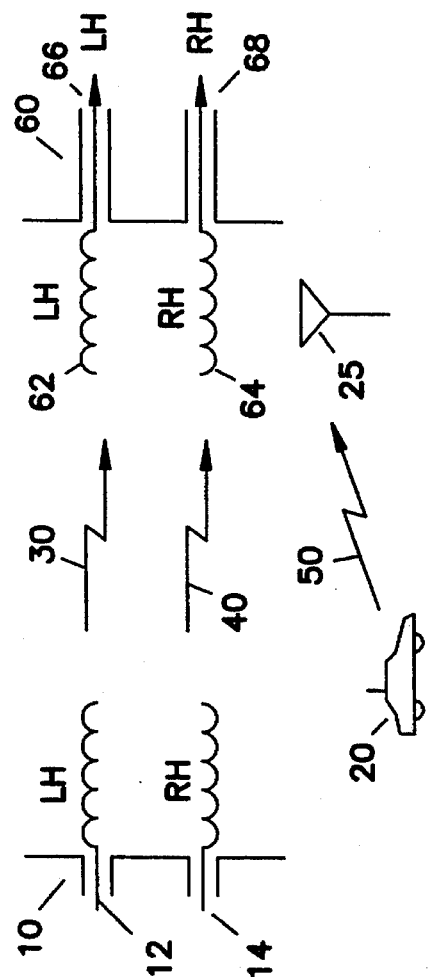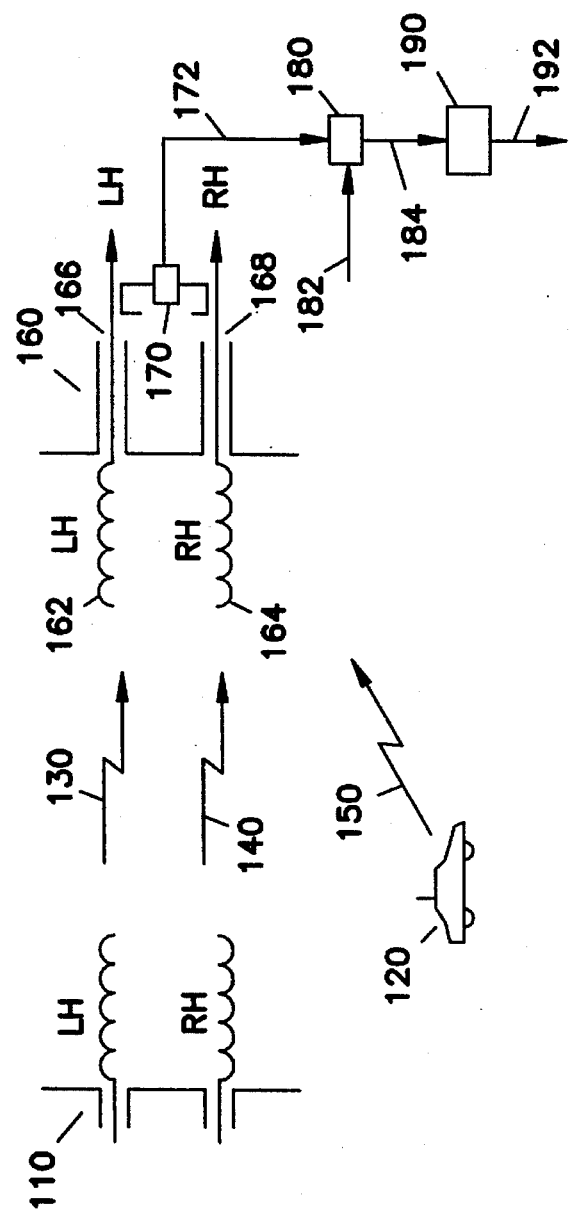

SPECTRAL SHARING COMMUNICATION SYSTEM WITH MINIMAL INTER-SIGNAL INTERFERENCE

This is a continuation of application Ser. No. 07/940,541, filed Sep. 4, 1992, which was abandoned upon the filing hereof.

FIELD OF THE INVENTION

The present invention relates to communications systems, and more specifically to communications systems capable of sharing a band of frequencies with minimal inter-signal interference.

BACKGROUND OF THE INVENTION

Broadcast communications systems utilize electromagnetic signals of a frequency or range of frequencies specific to that system in order to transmit information between remote locations. The frequencies must be known to both the transmitter and receiver in order for the communication to be successful. The receiver will only recognize signals of the selected frequencies, and will treat all signals of those frequencies as the received communication. As a result, any phenomenon which modifies the transmitted signal prior to its reception will distort the information received. This is called "interference".

Electromagnetic signals of the same or similar frequencies will combine to form a new signal. As a result, multiple communications signals cannot easily utilize the allocation of frequency spectra in the same geographic region. This has led to governmental regulation to assign specific frequency spectra or "bands" to specific uses. Unfortunately, there are only a finite number of such bands available in any given geographic region, and there is an ever-increasing number of users desiring to utilize those bands.

Two such forms of communication are microwave transmission and Personal Communications Service ("PCS"). Microwave transmission are point-to-point transmission systems utilizing signals in the 1.5 GHz to 40 GHz frequency bands. The transmitted signal is aimed along a direct line and most of the energy in the signal is directed along a line-of-sight at a frequency in that band. This is made possible by the fact that both the transmitter and receiver are located at fixed locations, and hence it is simple to aim the signal.

PCS has been defined by the Federal Communications Commission in Docket GEN 90–314, June 1990. PCS may utilize signals in the 1.5 GHz to 2.5 GHz frequency bands, which overlap with the microwave transmission frequency bands discussed above. Also, PCS units are not stationary, as will be discussed below. One example of a service offered within a PCS system is a portable cellular telephone-like service. Because one station in such service is portable, it is difficult to broadcast in a narrow path due to tracking difficulties. Hence a portable PCS transmitter system such as a cellular telephone device requires a broader geographic range of transmission.

There is a need in microwave transmission systems to maintain a low error rate. The bit error rate ("BER") of such systems can be as low as $10^{-7}$ or $10^{-8}$. Presently, the microwave system uses two linear polarized signals. One of these signals is "vertically polarized", meaning that the electric field lies entirely within a vertical plane. The second signal is "horizontally polarized", meaning that the electric field lies entirely in a horizontal plane. When the two signals are perpendicular, as in this case, they do not interfere with one another. The signals are said to be "orthogonal". The two signals in the microwave system are used to improve adjacent channel discrimination. It is commonly practiced in microwave relay systems to interleave alternate radio channel frequencies on the two linearly polarized signals. It is also common to transmit two different information signals on the two linearly polarized signals. Together with the highly directional nature of the signal, this allows for an efficient and reliable transmission of data.

As discussed above, PCS systems including cellular telephone service require a far greater broadcast area than microwave systems, as the mobile unit is often located in a moving vehicle and it is difficult to precisely align a signal with a moving receiver. Although the need for a low error rate is not as critical for PCS systems as that for a microwave system, voice quality and data transmission are improved by minimizing interference to the transmitted signal.

PCS systems such as cellular telephone systems typically utilize a vertically aligned signal. As is clear from the above discussion, such a signal would interfere with any microwave signal broadcast in the same frequency band in the same geographical region. Even minor interference would raise the BER for the microwave system to an unacceptable level. Hence prior art systems do not permit PCS and microwave systems to share the same frequency band.

It would therefore be desirable to provide a communications system which allow both microwave and PCS systems to share a common frequency band with minimal interference between the signals.

Broadly, it is an object of the present invention to provide an improved broadcast communications system.

It is a further object of the present invention to provide a communications system which allows a microwave transmission system and a PCS system utilizing cellular telephone technology to share a common frequency band with minimal interference between the signals.

These and other objects of the present invention will be apparent to those skilled in the art from the following detailed description of the invention and the accompanying drawings.

SUMMARY OF THE INVENTION

The present invention comprises a microwave communications system. This system includes transmission means for transmitting a first signal and a second signal. The first signal and the second signal are oppositely circularly polarized electromagnetic waves within a predefined frequency range. The system also includes receiver means for receiving the first and second signals.

In the preferred embodiment of the present invention the receiver means may further include a first microwave receiver for receiving the first signal. It then includes a second receiver for receiving the second signal. The receiving means also includes signal combining means for combining the first signal and the second signal to generate a composite signal. It then includes signal comparison means to generate a comparison signal by comparing the average value of the amplitude of the composite signal with a predetermined value. Finally, the system includes control means responsive to the comparison signal for modifying the operation of the transmission means.

In an alternative embodiment the circularly polarized signals of the first embodiment are replaced by orthogonal elliptically polarized signals.

BRIEF DESCRIPTION OF THE DRAWINGS

FIG. 1 illustrates a preferred embodiment of a communications system according to the present invention.

FIG. 2 illustrates a preferred embodiment of microwave receiving means according to FIG. 1.

DETAILED DESCRIPTION OF THE INVENTION

Figure 3:
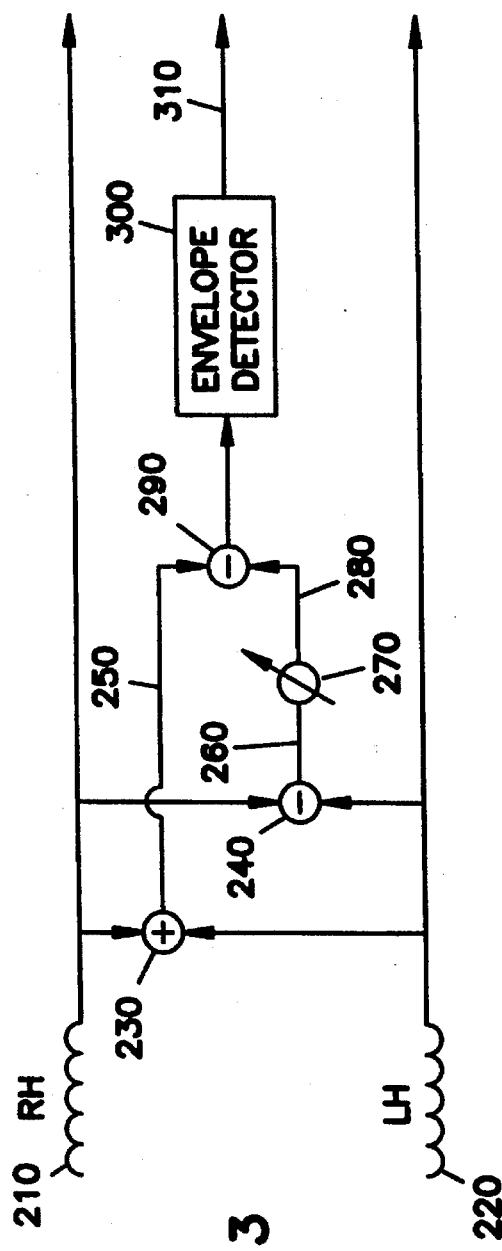
FIG. 3 illustrates one preferred embodiment of signal combining means 170 of FIG. 2.

The present invention relates to a broadcast communications system which allows two distinct transmissions to utilize the same frequency band. More specifically, the two transmissions are of distinct types, one being a point-to-point microwave transmission link and the other being a PCS system.

FIG. 1 illustrates a preferred embodiment of this communications system. A microwave transmission means 10 includes a first directional transmitter 12 for generating a first signal 30 and a second directional transmitter 14 for generating a second signal 40. First signal 30 and second signal 40 are circularly polarized, with first signal 30 having a right-handed (RH) polarization and second signal 40 having a left-handed (LH) polarization. Therefore first signal 30 and second signal 40 are orthogonal, and do not interfere with one another. They contain essentially identical information and are transmitted at the same frequency, $f_1$ as shown in FIG. 1. In the preferred embodiment of the present invention, $f_1$ is chosen within the range of 1.5 GHz to 2.5 GHz.

First signal 30 and second signal 40 are received at microwave receiving means 60. First signal 30 is received at first receiver 62, which is placed upon line 66. Second signal 40 is received at second receiver 64, which is placed upon line 68. The signals on lines 66 and line 68 may be processed by the microwave receiver using methods well known to those skilled in the art, and hence will not be discussed herein.

In addition, a mobile PCS transceiver 20 may be located in the vicinity of the microwave transmission system. A vertically polarized PCS signal 50 may also be transmitted at frequency $f_1$ to a fixed location PCS station 25 without concern for interference between PCS signal 50 and first signal 30 and second signal 40. It is known in the art that there is substantial power isolation between linear and circular polarization, in some cases greater than 6 dB. An exemplary discussion of this power isolation is found in Kraus, Antenna, (McGraw-Hill, 1950). Therefore both the microwave point-to-point system and the PCS system may utilize the same frequency band with significantly less interference than with linearly polarized signals alone.

There will nonetheless be some interference in an actual system between these signals. While the highly directional nature of the microwave link makes the likelihood of interference with the PCS signal small, the wide directional spread of the PCS signal makes some interference with the microwave signal a distinct possibility. Such interference can dramatically increase the BER of the microwave transmission. Hence the microwave system must be capable of detecting and correcting for such interference.

A preferred embodiment of microwave receiving means 60 of FIG. 1 which can respond to such interference is illustrated in FIG. 2. As in FIG. 1, first signal 130 and second signal 140 are received at a microwave receiver 160. First signal 130 is received at first receiver 162 and is placed on line 166. Second signal 140 is received at second receiver 164 and is placed on line 168. The signals on lines 166 and 168 are then combined in signal combining means 170. Signal combining means 170 combines the first signal on line 166 and the second signal on line 168 to generate a composite signal $S_v$, which is output on line 172. Error threshold detection means 180 generates an error warning signal on line 184 by comparing the composite signal $S_v$ on line 172 with a predetermined threshold level L on line 182. Threshold level L is chosen as the value of composite signal $S_v$ at which there is a maximum acceptable noise component of the received signal from the PCS system adjusted for the desired vertical component of the transmitted microwave signal.

The error warning signal on line 184 is then input to a control means 190. Control means 190 is responsive to the error warning signal on line 184 and produces a control signal on line 192 which is transmitted to the transmission means (not shown). This control signal is used by transmission means for modifying the transmission. Such modification is discussed in further detail below.

Microwave receiving means 160 operates as follows. The first and second received signals appear on lines 166 and 168, respectively. These signals are combined at signal combining means 170. The manner in which the signals are combined is discussed in detail below. In the absence of interference, the received signal has the same amplitude as the transmitted signal. Interference will contribute an additional vertical component to increase the level of $S_v$. Therefore the interference component can be measured by proper combination of the two signals, and a noise signal may be derived. Signal combining means 170 may then average the value of this composite signal to include an average noise level signal. This average signal plus noise level may then be the composite signal output $S_v$ on line 172.

Signal comparison means 180 compares the composite signal on line 172 to a threshold level or value on line 182. This threshold level will ordinarily be constant, but those skilled in the art will understand that this threshold level may be varied under different circumstances. Error threshold detection based on signal comparison means 180 will then produce an error warning signal, which is output on line 184. Ordinarily a simple binary signal will be sufficient, although the use of other types of comparison signals will become obvious to those skilled in the art.

As stated above, the error warning signal on line 184 is then input to control means 190. Control means 190 is responsive to the error warning signal on line 184 to produces a control signal on line 192 which is transmitted to the transmission means 110. This control signal is used by transmission means 110 for modifying the operation of transmission means 110. Typically this will entail boosting power to the signals 130 and 140. Since the interference should remain at a relatively steady level and will be unaffected by this change, the ratio of signal to noise (SNR) will improve under this configuration. Alternatively, a signal or warning may be issued to the PCS transmitter to request rerouting of the PCS transmission to minimize noise. Other methods of modifying the transmission will become obvious to those skilled in the art.

The improvement provided by the substitution of a circularly polarized transmission system for the linearly polarized transmission system of the prior art may be understood by way of several examples of a method of error detection in accordance with the present invention as described above. The electric field equations for two linearly polarized electromagnetic waves are:

$$E_v = A_v \cos \omega t \quad (1)$$

$$E_H = A_H \sin \omega t \quad (2)$$

where $\omega = (2\pi) * f_1$. And for two circularly polarized waves:

$$E_{LH} = A_v \cos \omega t - A_H \sin \omega t \quad (3)$$

$$E_{RH} = A_v \cos \omega t + A_H \sin \omega t \quad (4)$$

The sum of and difference between Equations (3) and (4) are therefore:

$$E_{RH} + E_{LH} = 2A_v \cos \omega t \quad (5)$$

$$E_{RH} - E_{LH} = 2A_H \sin \omega t \quad (6)$$

These equations are merely a multiple of the equations for linearly polarized waves. This well-known fact may be utilized in the present invention as follows. The equations representing the received signals with a vertical interference term are:

$$E_{LHR} = (A_{VT} \cos \omega t + A_{HT} \sin \omega t) + A_{VI} \cos (\omega t + \gamma) \quad (7)$$

$$E_{RHR} = (A_{VT} \cos \omega t + A_{HT} \sin \omega t) + A_{VI} \cos (\omega t + \gamma) \quad (8)$$

where $E_{LHR}$ and $E_{RHR}$ are electric field wave equations for the received signals, $A_{VT}$ and $A_{HT}$ are amplitude components of the transmitted signals, and $A_{VI}$ is the amplitude component and $\gamma$ is the phase of the vertical interference signal. By combining Equations (7) and (8) in the same manner that Equations (3) and (4) were combined to yield Equations (5) and (6), it is clear that:

$$E_{RHR} + E_{LHR} = 2A_{VT} \cos \omega t + 2A_{VI} \cos (\omega t + \gamma) \quad (9)$$

$$E_{RHR} - E_{LHR} = 2A_{HT} \sin \omega t \quad (10)$$

Therefore in one preferred embodiment, signal combining means 170 comprises a signal summing circuit and an envelope detector, both of which are well known in the an. An envelope detector is a device which can determine the average of the absolute value of the amplitude of a signal. A summation of the first and second received signals on lines 166 and 168 is seen from Equation (9) to yield a single vertically polarized signal, and the output of an envelope detector for this vertically polarized signal can be shown to be greater or less than $2 A_{VT}$. Thus by setting L to be equal to $2 A_{VT}$ plus or minus a tolerable error level, interference may be detected.

In a yet further preferred embodiment, shown in FIG. 3, an embodiment of signal combining means 170 of FIG. 2 comprises both a signal summing circuit 230 and a signal subtracting circuit 240, the output of signal subtracting circuit 240 passing through a 90° phase shifter 270. The output 280 from the phase shifter 270 is subtracted from the output 250 of signal summing circuit 230 at the subtracting circuit 290. The output from subtracting circuit 290 passes through an envelope detector 300 and becomes the amplitude of the interference signal 310.

Equations (9) and (10) above represent the output 250 of signal summing circuit 230 and the output 260 of signal subtracting circuit 240, respectively. Output 260 of subtracting circuit 240 passing through the phase shifter 270 may therefore be shown to be $2 A_{HT} \cos \omega t$. For circularly polarized waves, the amplitude $A_{VT}$ of Equation (9) is equal to the amplitude $A_{HT}$ of Equation (10). Thus by subtracting these signals by means of signal subtracting circuit 290 and passing the output through envelope detector 300, the output may be shown to equal $2 A_{VI}$. With this embodiment the threshold level L of FIG. 2 should therefore be set to a maximum acceptable error level above which transmission should be modified.

It should be noted that although it is preferred that the polarization be circular in order to provide improved detection of interference signals, it will be obvious to those skilled in the an that any of the above combination schemes will work with orthogonal elliptically polarized signals, although the exact values of the components will change accordingly.

Figure 4:
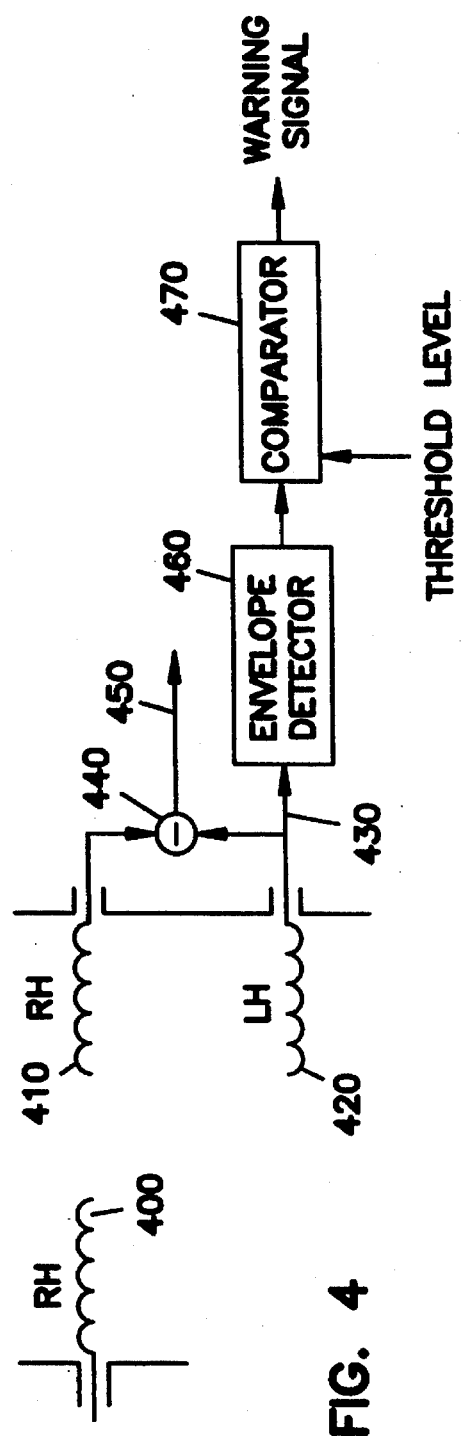
FIG. 4 illustrates an embodiment of a communications system according to the present invention which utilizes only one circularly polarized signal.

It should also be noted that the present invention will operate with only a single transmitted signal as well. An embodiment of the present invention utilizing only a right-handed circularly polarized signal is illustrated in FIG. 4. It may be seen that such transmission would result in a right-handed signal being received which is identical to that of Equations (7). However, the left-handed received signal would be represented by:

$$E_{LHR} = A_{VI} \cos (\omega t + \gamma) \quad (11)$$

Equation (11) represents the signal received at the left-handed circularly polarized antenna. In this case, the received signal is only the interference signal. Therefore by subtracting Equation (11) from Equation (8), the desired signal may be received.

FIG. 4 illustrates such a system. The right-handed circularly polarized wave is transmitted at the right-handed (RH) circularly polarized transmitter 400 and received by the RH circularly polarized receiver 410. In addition, the RH receiver 410 also receives the interference signal indicated in Equation (8). The left-handed (LH) circularly polarized receiver 420 only receives the interference signal 430 as indicated in Equation (11). The output 430 can be used for monitoring interference. Also, the two received signals from RH receiver 41 0 and LH receiver 420 are input to a subtracting circuit 440. The output 450 of subtracting circuit 440 is the desired signal without the interference signal. The output 430 is passed through an envelope detector 460 and compared with a predetermined threshold level by comparison circuit 470. A warning signal is generated by comparison circuit 470 if the average value of the LH signal exceeds the threshold level.

There has been described herein an improved broadcasting communications system. Various modifications to the present invention will become apparent to those skilled in the art from the foregoing description and accompanying drawings. Accordingly, the present invention is to be limited solely by the following claims.

What is claimed is:

1. A communication systems compensating for interference between a transmitter and a receiver, comprising:

means for separating an original signal into two elliptically polarized waves within a predetermined frequency range;

transmitting means, coupled to the separating means and having an adjustable power output, for transmitting the two oppositely elliptically polarized waves at a predetermined power level;

receiver means for receiving the two waves, the receiver means further comprising combining means for combining the two waves to reproduce the original signal as an output and feedback control generating means for processing summing the two waves to generate a feedback control signal representing interference occurring between the receiver means and the transmitting means;

comparing means for comparing the feedback control signal to a predetermined threshold signal to generate a comparison signal; and control means for adjusting the power output of the transmitting means in response to the comparison signal to compensate for the interference occurring between the transmitting means and the receiving means.

2. The communication system of claim 1 wherein the predetermined frequency range is between 1.5 GHz and 2.5 Ghz.

3. The communication system of claim 1 wherein the waves are circularly polarized.

4. A communications system for compensating for interference between a transmitter and a receiver, comprising:

means for separating an original signal into a first wave and a second wave, wherein the first wave and the second wave are oppositely elliptically polarized electromagnetic waves within a predetermined frequency range;

transmitting means, coupled to the separating means and having an adjustable power output, for transmitting the two oppositely elliptically polarized electromagnetic waves at a predetermined power level; receiver means for receiving the first wave and the second wave to reproduce the original signal as an output, the receiver means further comprising a first receiver for receiving the first wave, a second receiver for receiving the second wave, means for summing the first received wave and the second received wave prior to reproducing the signal as an output to generate a feedback signal representing interference occurring between the receiver means and the transmitting means, and signal comparison means to generate a comparison signal by comparing the average value of the amplitude of the feedback signal with a predetermined value; and means, responsive to the comparison signal, for modifying the operation of the transmitting means to compensate for interference occurring between the transmitting means and the receiver means.

5. The communication system of claim 4 wherein the predetermined frequency range is between 1.5 GHz and 2.5 GHz.

6. The communication system of claim 4 wherein the modifying means further comprises means for increasing the power output of the transmitting means thereby increasing the power level of the first wave and the power level of the second wave.

7. The communication system of claim 4 wherein the first wave and the second wave are oppositely circularly polarized.

8. A communications receiver for compensating for interference occurring between a transmitter and the receiver, comprising:

a first receiving means, having an input and an output, for receiving a signal elliptically polarized in a first direction;

a second receiving means, having an input and an output, for receiving the signal elliptically polarized in a second direction opposite to the first direction;

combining means for combining the output of the first receiving means and the output of the second receiving means to generate a composite signal, the combining means further comprising signal summing means for summing the output of the first receiving means and the output of the second receiving means, first signal subtracting means for subtracting the output of the second receiving means from the output of the irst receiving means, phase shifting means for phase shifting the output of the first signal subtracting means by 90°, second signal subtracting means for subtracting the output of the phase shifting means from the output of the signal summing means, and detector means for generating an amplitude value representing the interference in response to the output of the second signal subtracting means;

signal comparison means for generating a comparison signal by comparing the average value of the amplitude of the composite signal with a predetermined value; and control means for generating control signals in response to the comparison signal, the control signals being communicated to a remote transmitter to modify the operation of the remote transmitter.

9. The communication system of claim 8 wherein the control means further comprises means for increasing the transmitter power output.

10. The communication system of claim 8 wherein the signal is circularly polarized in a first direction and the signal is circularly polarized in a second direction opposite to the first direction.

11. A method utilizing electromagnetic signals for communication between a transmitter and a receiver, the method comprising the steps of:

separating an original signal into two elliptically polarized waves within a predetermined frequency range;

transmitting the two oppositely elliptically polarized waves at a predetermined power level;

receiving the two oppositely elliptically polarized waves;

reproducing the original signal from the two received waves as an output of the receiver;

summing the two received waves to produce a feedback signal representing interference occurring between the receiver and the transmitter;

comparing the feedback signal to a predetermined threshold signal to generate a comparison signal; and adjusting the power level of the two waves at the transmitter in response to the comparison signal to compensate for the interference occurring between the transmitter and the receiver.

* * * * *

UNITED STATES PATENT AND TRADEMARK OFFICE
CERTIFICATE OF CORRECTION

PATENT NO. : 5,507,020
DATED : April 9, 1996
INVENTOR(S) : William C. Y. Lee

It is certified that error appears in the above-identified patent and that said Letters Patent is hereby corrected as shown below:

In column 3, line 48, "an" should read --art--;

In column 5, line 38, "$(\omega T \gamma)$" should read --$(\omega T + \gamma)$--;

In column 5, line 44, "an" should read --art--;

In column 6, line 40, "41 0" should read --410--.

Signed and Sealed this

Thirtieth Day of July, 1996

Attest:

BRUCE LEHMAN

*Attesting Officer*  *Commissioner of Patents and Trademarks*